(12) United States Patent
Kazda et al.

(10) Patent No.: US 12,282,721 B2
(45) Date of Patent: Apr. 22, 2025

(54) NETLIST DESIGN FOR POST SILICON LOCAL CLOCK CONTROLLER TIMING IMPROVEMENT

(71) Applicant: International Business Machines Corporation, Armonk, NY (US)

(72) Inventors: Michael Kazda, Poughkeepsie, NY (US); Sean Michael Carey, Dutchess, NY (US); Frank J. Musante, Poughkeepsie, NY (US); Michael Hemsley Wood, Wilmington, DE (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 17/684,451

(22) Filed: Mar. 2, 2022

(65) Prior Publication Data

US 2023/0281365 A1  Sep. 7, 2023

(51) Int. Cl.
*G06F 30/327* (2020.01)
(52) U.S. Cl.
CPC ................................ *G06F 30/327* (2020.01)
(58) Field of Classification Search
USPC ........................................................ 716/103
See application file for complete search history.

(56) References Cited

U.S. PATENT DOCUMENTS

| | | | |
|---|---|---|---|
| 5,455,931 A | 10/1995 | Camporese et al. | |
| 6,470,458 B1 | 10/2002 | Dreps et al. | |
| 7,536,617 B2 | 5/2009 | Jun et al. | |
| 7,793,179 B2 | 9/2010 | Sul | |
| 8,949,763 B1* | 2/2015 | Fung | G06F 30/392 716/135 |
| 9,128,153 B2 | 9/2015 | Fox | |
| 9,678,156 B2 | 6/2017 | Wang et al. | |
| 10,956,639 B1 | 3/2021 | Lin et al. | |
| 2011/0191170 A1* | 8/2011 | Zhang | G06Q 30/0247 705/14.46 |
| 2014/0304205 A1* | 10/2014 | Fastow | G10L 15/32 706/47 |
| 2015/0242559 A1* | 8/2015 | Antony | G06F 30/398 716/113 |

FOREIGN PATENT DOCUMENTS

KR  100817236 B1  3/2008

* cited by examiner

*Primary Examiner* — Mohammed Alam
(74) *Attorney, Agent, or Firm* — Randy Tejeda

(57) ABSTRACT

Aspects of the invention include determining a netlist for an integrated circuit design, wherein the netlist includes a design for placement of a plurality of latches, determining a set of timing paths, wherein each timing path includes a capture latch and at least one launch latch connected to a same local clock buffer controller through a local clock buffer OR circuit, calculating a slack value for each timing path, determining one or more candidate timing paths from the set of timing paths, wherein the one or more candidate timing paths have a slack value below a threshold slack value, calculating a score for each candidate timing path based on a count of a number of launch-capture latch pairs, adjusting an interconnect for a first candidate timing path based on the first candidate timing path having a highest score, and generating an updated netlist based on the adjusting the interconnect.

20 Claims, 6 Drawing Sheets

NETLIST DESIGN FOR POST SILICON LOCAL CLOCK CONTROLLER TIMING IMPROVEMENT

BACKGROUND

The present invention generally relates to clock management, and more specifically, to improved systems and methods for netlist design for post-silicon local clock controller timing improvement.

An integrated circuit (IC) chip is fabricated by first conceiving the logical circuit description, and then converting that logical description into a physical description, or geometric layout. This process is usually carried out using a "netlist," which is a record of all of the nets, or interconnections, between the cell pins. A layout typically consists of a set of planar geometric shapes in several layers. The layout is then checked to ensure that it meets all of the design requirements, particularly timing requirements. The result is a set of design files known as an intermediate form that describes the layout. The design files are then converted into pattern generator files that are used to produce patterns called masks by an optical or electron beam pattern generator. During fabrication, these masks are used to pattern a silicon wafer using a sequence of photolithographic steps. The process of converting the specifications of an electrical circuit into a layout is called the physical design.

Cell placement in semiconductor fabrication involves a determination of where particular cells should optimally (or near-optimally) be located on the surface of an integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turnaround time and enhanced chip performance. Several different programming languages have been created for electronic design automation (EDA) including Verilog, VHDL and TDML. A typical EDA system receives one or more high level behavioral descriptions of an IC device, and translates this high level design language description into netlists of various levels of abstraction.

While current placement techniques provide adequate placement of cells with regard to their data interconnections, there is an additional challenge for a designer because of timing issues that can arise after the fabrication (e.g., post-silicon). In some instances, the timing issues can be addressed post silicon using delaying techniques. However, certain types of components (e.g., launch and capture latches) cannot benefit from a post-silicon adjustment if they share a common local clock buffer controller.

SUMMARY

Embodiments of the present invention are directed to local clock controller timing improvement. A non-limiting example computer-implemented method includes determining, by a processor, a netlist for an integrated circuit design, wherein the netlist includes a design for placement of a plurality of latches within an integrated circuit, determining a set of timing paths from the netlist, wherein each timing path in the set of timing paths includes a capture latch and at least one launch latch connected to a same local clock buffer controller through a local clock buffer OR circuit, calculating a slack value for each timing path in the set of timing paths, determining one or more candidate timing paths from the set of timing paths, wherein the one or more candidate timing paths have a slack value below a threshold slack value, calculating a score for each candidate timing path of the one or more candidate timing paths based on a count of a number of launch latch and capture latch pairs within the candidate timing path, adjusting an interconnect for a first candidate timing path from the one or more candidate timing paths based on the first candidate timing path having a highest score of all scores for the one or more candidate timing path, and generating an updated netlist based on the adjusting the interconnect for the first candidate timing path.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide systems and methods for post-silicon local clock controller timing improvement in an integrated circuit (IC). Generally speaking, aspects of the present invention provide a methodology for placing IC objects within the IC to achieve a minimization of capture latches and launch latches sharing the same local clock buffer controller (LCBCNTL) circuit. This methodology is applied iteratively so that any post-silicon timing issues can be resolved using test floor techniques. Post-silicon refers to the stage in the fabrication process of an IC where the IC is fully fabricated and is in the testing phase prior to being shipped to a customer. In the post-silicon phase, the physical objects within the IC cannot be changed; however, timing characteristics for local clock buffers (LCBs), local clock buffer controllers (LCBCTNLs), and local clock buffer logic gates (LCBORs) can be adjusted to account for any timing issues discovered after fabrication. Latches (flip-flops) are clock driven objects in an IC. A capture latch refers to a latch that captures data while a launch latch refers to a latch that launches the data. Post silicon and on the test floor, if timing is not correct for a timing path, a delay can be introduced within a LCBCTNL; however, if a launch and capture latch share the same LCBCNTL, this delay cannot be introduced to account for the incorrect timing path.

Figure 1A:
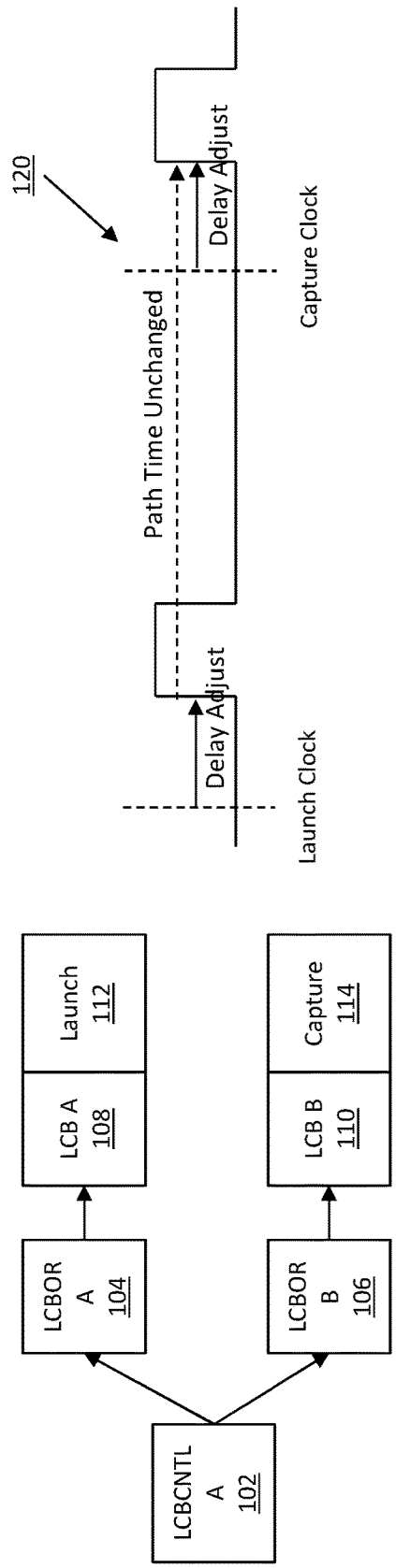
FIG. 1a depicts a launch latch and capture latch that share a common local clock buffer controller according to one or more embodiments.

FIG. 1a depicts a launch latch and a capture latch that share a common local clock buffer controller (LCB CNTL) according to one or more embodiments. Here, the LCBCNTL A 102 controls the launch latch 112 and the capture latch 114 through the timing path which includes LCBOR A 104, LCB A 108, LCBOR B 106, and LCB B 110. The timing chart 120 shows that if a delay is introduced in the LCBCNTL 102, the delay cannot be modified to affect the launch and capture separately (they both receive the same delay adjustment), and thus the delay will affect both the launch latch 112 and the capture latch 114.

Figure 1B:
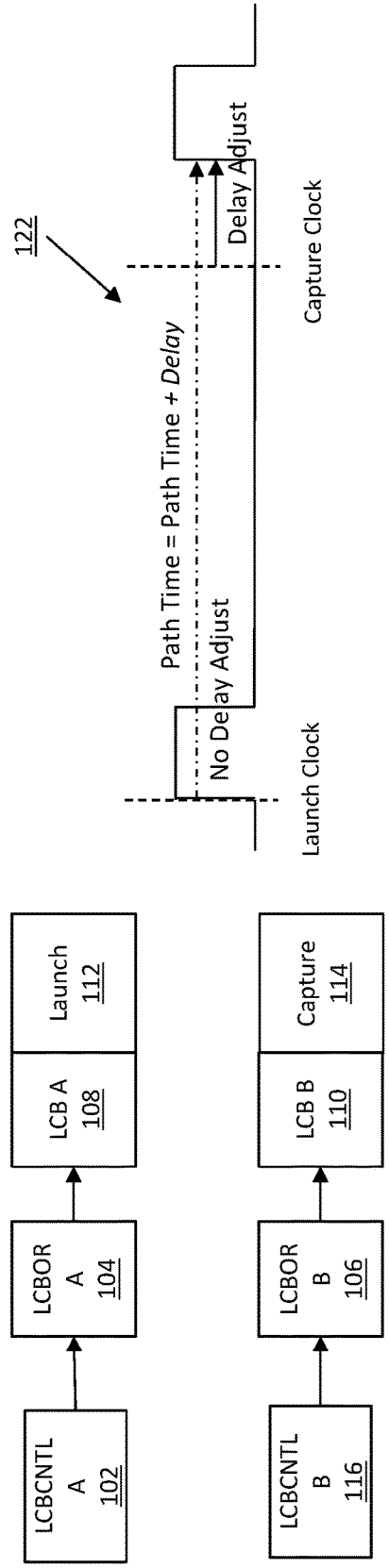
FIG. 1b depicts a launch latch and capture latch that have separate local clock buffer controllers according to one or more embodiments in the present invention.

FIG. 1B depicts a launch latch and capture latch that have separate LCB CNTLs according to one or more embodiments of the present invention. Prior to fabrication of an IC, minimizing the sharing of LCBCNTLs between launch and capture latches can allow for post-silicon clock delay tuning. Here, the capture latch 114 is now controlled by LCBCNTL B 116. In this instance, the timing chart 122 shows a delay added to LCBCNTL B 116 will result in only a delay for the capture latch 114 while the launch latch 112 does not experience a delay. Because certain timing issues are discovered post-silicon, tuning timing paths is a technique used to account for these timing issues but can only be achieved when the LCBCNTL is not shared by both a launch and capture latch.

Figure 2:
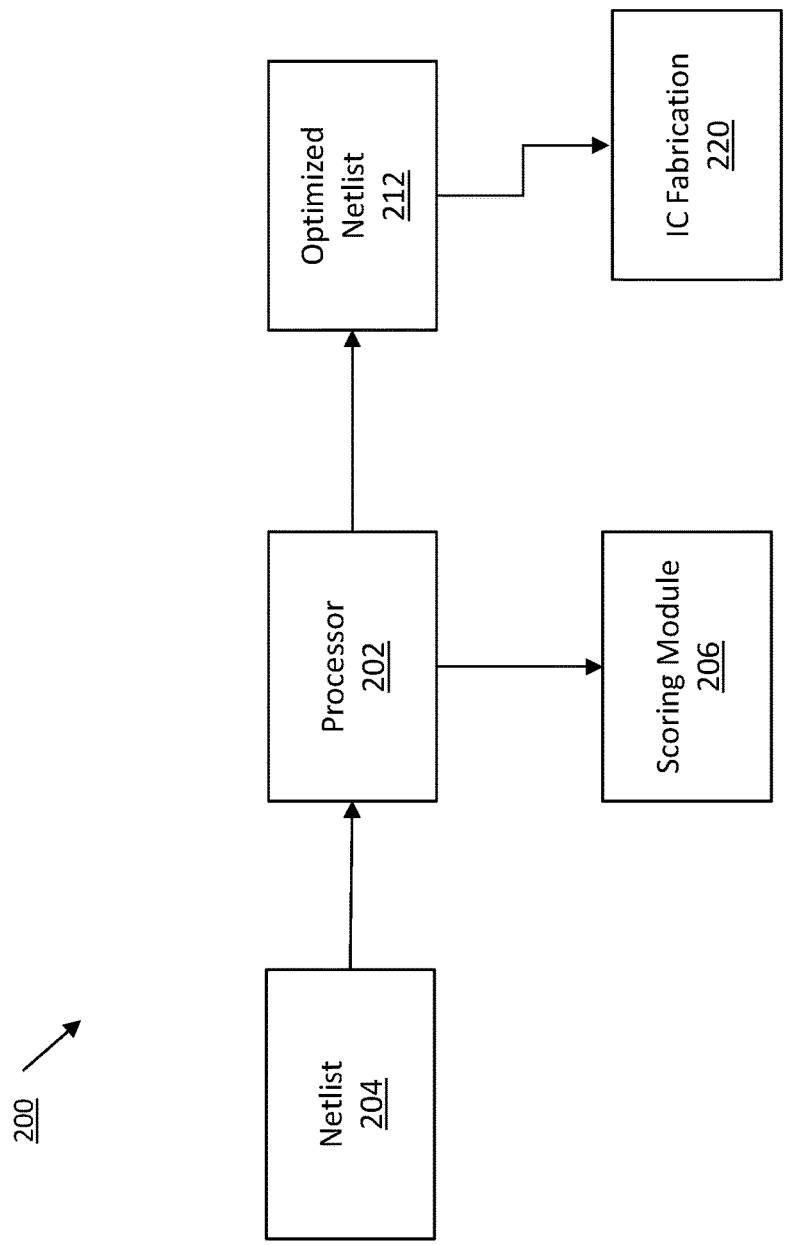
FIG. 2 depicts a system for local clock controller timing improvement according to one or more embodiments of the invention.

In an ideal situation, each launch and each capture latch would have its own LCBCNTL to adjust for timing path issues. However, this is often not possible due to space, power and cost constraints in an IC. During the design phase of the IC, the placement of wires between LCBCNTLs and latches is done on a geometric basis, meaning that the closest LCBCNTL is selected for latches. In one or more embodiments of the present invention, during the design phase, the so called "netlist" can be iteratively adjusted to minimize the number of LCBCNTLs that share launch and capture latches prior to the fabrication of the IC. FIG. 2 depicts a system for local clock controller timing improvement according to one or more embodiments of the invention. The system 200 includes a processor 202 which can reconfigure the clock connections prior to manufacturing. The processor 202 is configured to utilize a scoring module 206 to analyze a netlist 204 to be used for IC fabrication. The netlist 204 refers to a record of all the nets (or interconnections) between object within the IC. In one or more embodiments of the invention, the processor 202 utilizes the scoring module 206 to compute a score for the configuration of the interconnections in the netlist 204. The processor 202 can iteratively alter the netlist 204 based on the scoring module 206 to output an optimized netlist 212 which is a netlist that has a score that is above a threshold score and/or a score that meets another metric as compared to a previous score in the iterative process. Once the optimized netlist 212 is determined, the optimized netlist 212 can be passed on to an IC fabrication 220 stage for fabrication of the IC.

Figure 3:
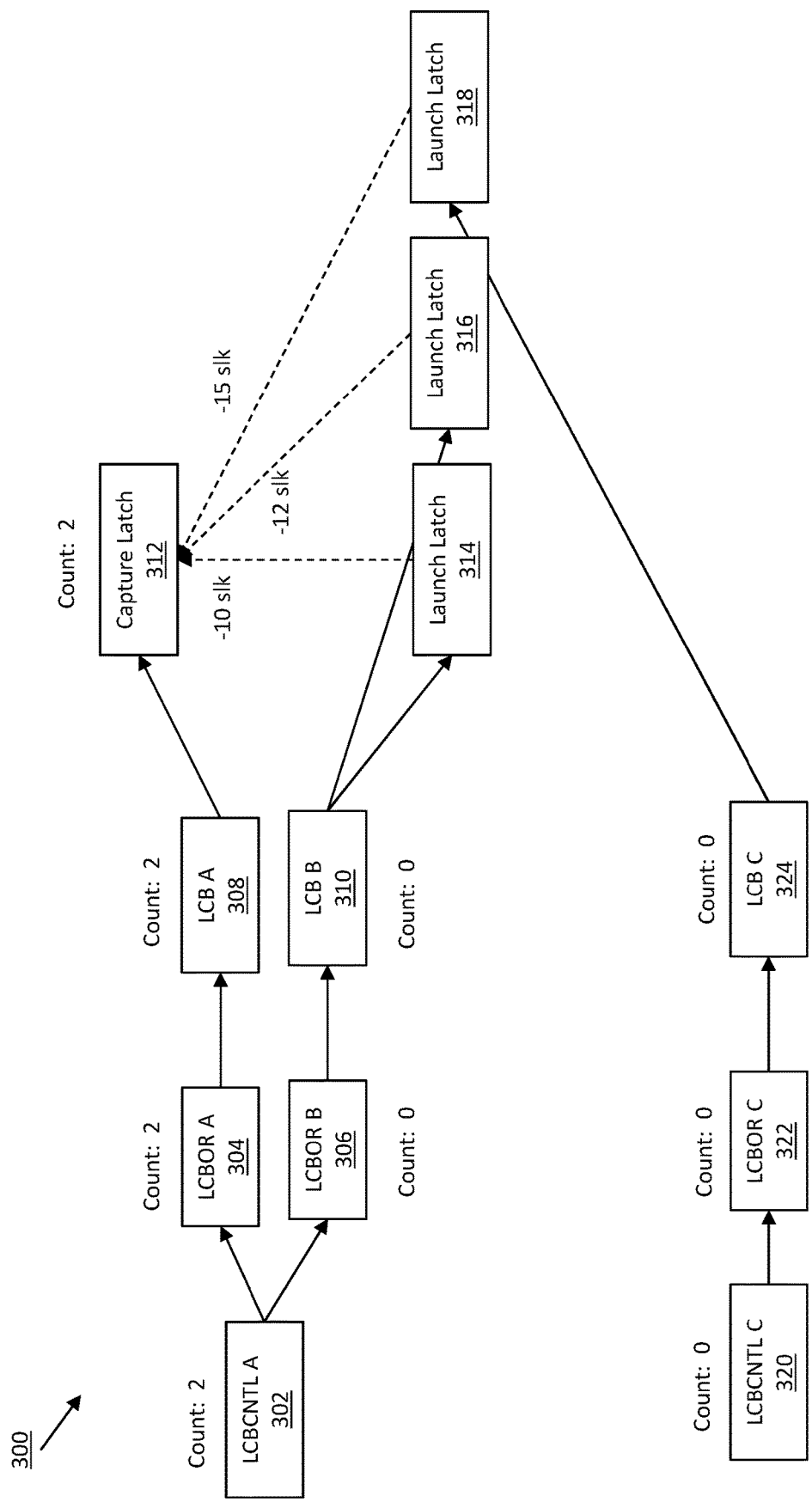
FIG. 3 depicts a block diagram illustrating a netlist for a portion of an integrated circuit (IC) according to one or more embodiments of the invention.

As mentioned above, the scoring module 206 is utilized to analyze the netlist 204 to calculate a score that allows for the processor 202 to make a determination as to whether and/or how to adjust the netlist 204 to minimize the clock controllers that have launch/capture latches. FIG. 3 depicts a block diagram illustrating a netlist for a portion of an integrated circuit (IC) according to one or more embodiments of the invention. The netlist 300 is illustrated as a block diagram for ease of description. The netlist 300 includes two local clock buffer controllers (LCBCNTL) 302, 320 which drive a set of latches 314, 316, 318 that launch data and latch 312 that captures data. LCBCNTL A 302 drives LCBOR A 304 and LCB A 308 connected to capture latch 312. LCBCNTL A 302 also drives LCBOR B 306 and LCB B 310 connected to launch latches 314, 316. LCBCNTL C 320 drives LCBOR C 322 and LCB C 324 which is connected to launch latch 318. The arrows in the block diagram represent interconnections between each of the objects.

In the netlist 300, all launch latches 314, 316, 318 are connected to capture latch 312. There are three timing paths that pass through the launch and capture latches. For example, a first timing path can be defined as the path from launch latch 314 to capture latch 312. A second timing path can be defined as the path from launch latch 318 to capture latch 312. Also, a third timing path is defined as the path from launch latch 316 to capture latch 312.

In one or more embodiments of the invention, to determine how to adjust the interconnections between the objects in the netlist, a score is computed. The score is representative of so called "failing timing paths." The failing timing paths are timing paths that have a slack value that is lower than a threshold slack value. The slack is defined as difference between actual or achieved time (as determined by a simulated design software) and the desired time for a timing path calculated based on requirements for the latches. For timing path slack determines if the design is working at the specified speed or frequency. Thus a positive slack value is preferred whereas a negative slack value is not preferred. The slack values in the netlist 300 are shown next to the dotted arrows for the timing paths described above (e.g., first timing path slack is "−10 slk"). The score for this netlist is calculated as an integer value of the total number of launch/capture latch pairs that share a LCBCNTL and that have a slack value below a slack threshold value. The slack threshold value can be defined as zero, a positive number and/or a negative number. In this case, all three timing paths have negative slack values and all three timing paths have a launch/capture pairs. However, at the latch level, the capture latch 312 has two launch/capture paths through launch latch 314, 316 and they all share the same LCBCNTL A 302. This results in capture latch 312 having a score of two (2). This score is summed with any other latches connected at the LCB level and then to the LCBOR level. In the illustrated example, the LCBORs are shown as having one LCB but in practice an LCBOR will connect with multiple LCBs. This scoring is then summed at the LCBOR level. In the illustrated example, the LCBOR A 304 has the highest score value and thus is a candidate for "rewiring." This means that the LCBOR A 304 should be connected to a different LCBCNTL instead of to LCBCNTL A 302. After a new LCBCNTL is identified and LCBOR A 304 is reconnected to this LCBCNTL, the scoring algorithm can iteratively re-score the netlist.

In one or more embodiments of the invention, the iterative scoring of the netlist can continue until the total scoring (summation of the all the LCBOR scores) is below a total scoring threshold and/or until the total scoring does not change by a certain number and/or percentage. For example, the algorithm could calculate scoring for the entire netlist and show an integer value of 2000. If the scoring threshold is 5000, then the algorithm could stop and no rewiring would occur. However, if the scoring threshold is 1500, then the algorithm would continue by identifying the candidate LCBOR (e.g., having the highest score from the launch/capture latches sharing an LCBCNTL) and rewire. In another embodiment, the algorithm continues until the total score from iteration to iteration only changes by less than a certain value (e.g., 2000 to 1995) and/or percentage (e.g., 5% improvement).

Figure 4:
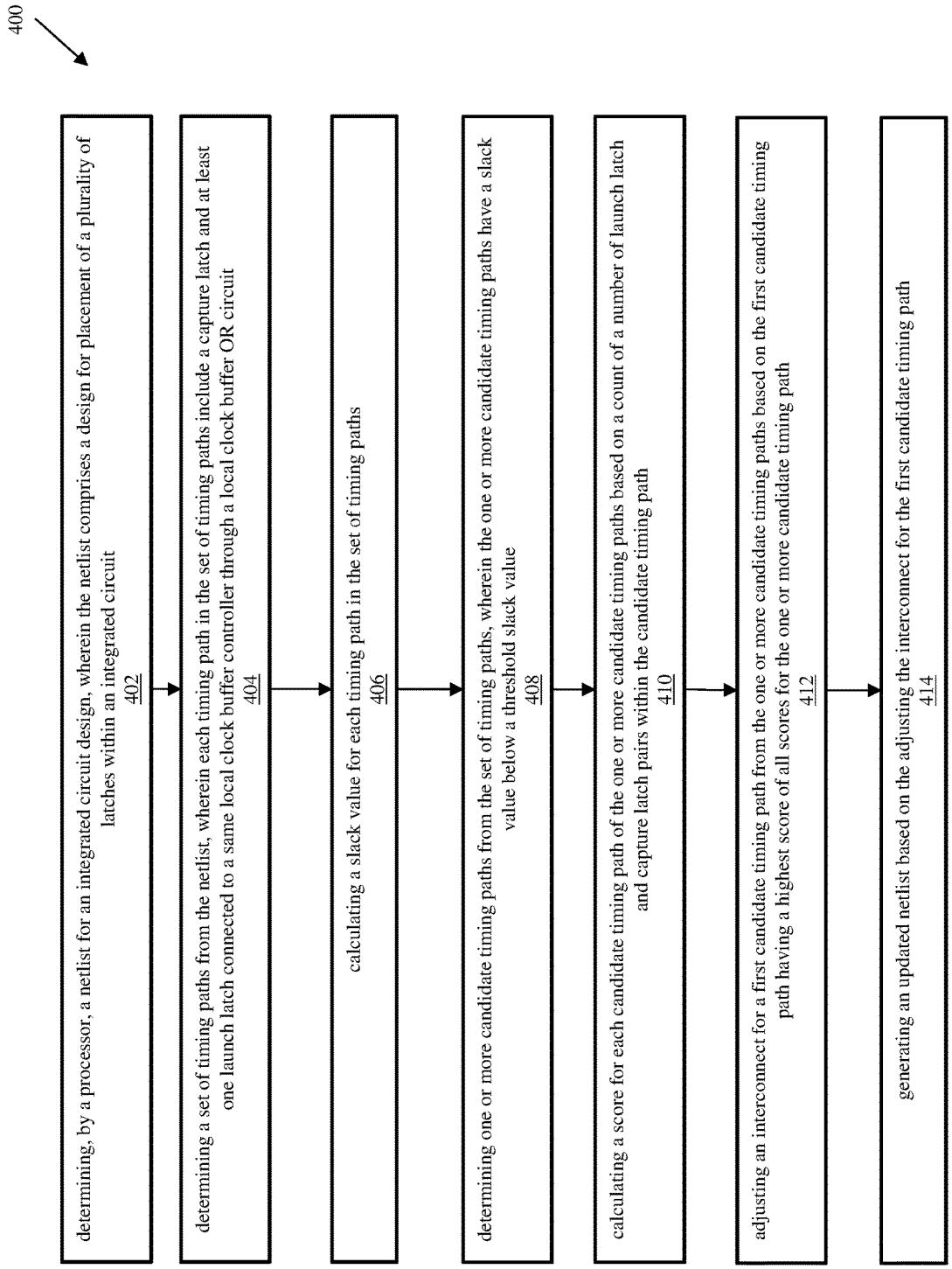
FIG. 4 depicts a flow diagram of a method for local clock controller timing improvement according to one or more embodiments of the invention.

FIG. 4 depicts a flow diagram of a method 400 for optimizing a netlist for post-silicon timing improvement according to one or more embodiments of the invention. At least a portion of the method 400 can be executed, for example, by the one or more processors 21 from FIG. 5. The method 400 includes determining, by a processor, a netlist for an integrated circuit design, wherein the netlist comprises a design for placement of a plurality of latches within an integrated circuit, as shown in block 402. Netlist refers more generally to a description of the connectivity of an electronic circuit. In this context, the netlist has the inter-connectivity of latches through an integrated circuit. At block 404, the method 400 includes determining a set of timing paths from the netlist, wherein each timing path in the set of timing paths include a capture latch and at least one launch latch connected to a same local clock buffer controller through a local clock buffer OR circuit. Also, at block 406, the method 400 includes calculating a slack value for each timing path in the set of timing paths. Slack value is the desired timing subtracted form the actual timing. Negative slack is undesirable thus a slack threshold is defined. The method 400 also includes determining one or more candidate timing paths from the set of timing paths, wherein the one or more candidate timing paths have a slack value below a threshold slack value, as shown at block 408. At block 410, the method 400 includes calculating a score for each candidate timing path of the one or more candidate timing paths based on a count of the number of launch latch and capture latch pairs within the candidate timing path. The score is for the capture latches that share a common local clock buffer controller with launch latches that meet the slack threshold. At block 412, the method 400 includes adjusting an interconnect for a first candidate timing path from the one or more candidate timing paths based on the first candidate timing path having a highest score. Here, the adjusting of the interconnect is to a physically nearest LCBCNTL for the first candidate timing path. And at block 414, the method 400 includes generating an updated netlist based on the adjusting the interconnect for the first candidate timing path. This updated netlist can be used to fabricate an integrated circuit that has fewer timing paths with controllers that share both launch and capture latches. Because of this, any adjustments needed post silicon can be performed by adjusting the delay in the clock controllers through modulation of pulse width and/or other mechanisms.

Additional processes may also be included. It should be understood that the processes depicted in FIG. 4 represent illustrations, and that other processes may be added or existing processes may be removed, modified, or rearranged without departing from the scope and spirit of the present disclosure.

Figure 5:
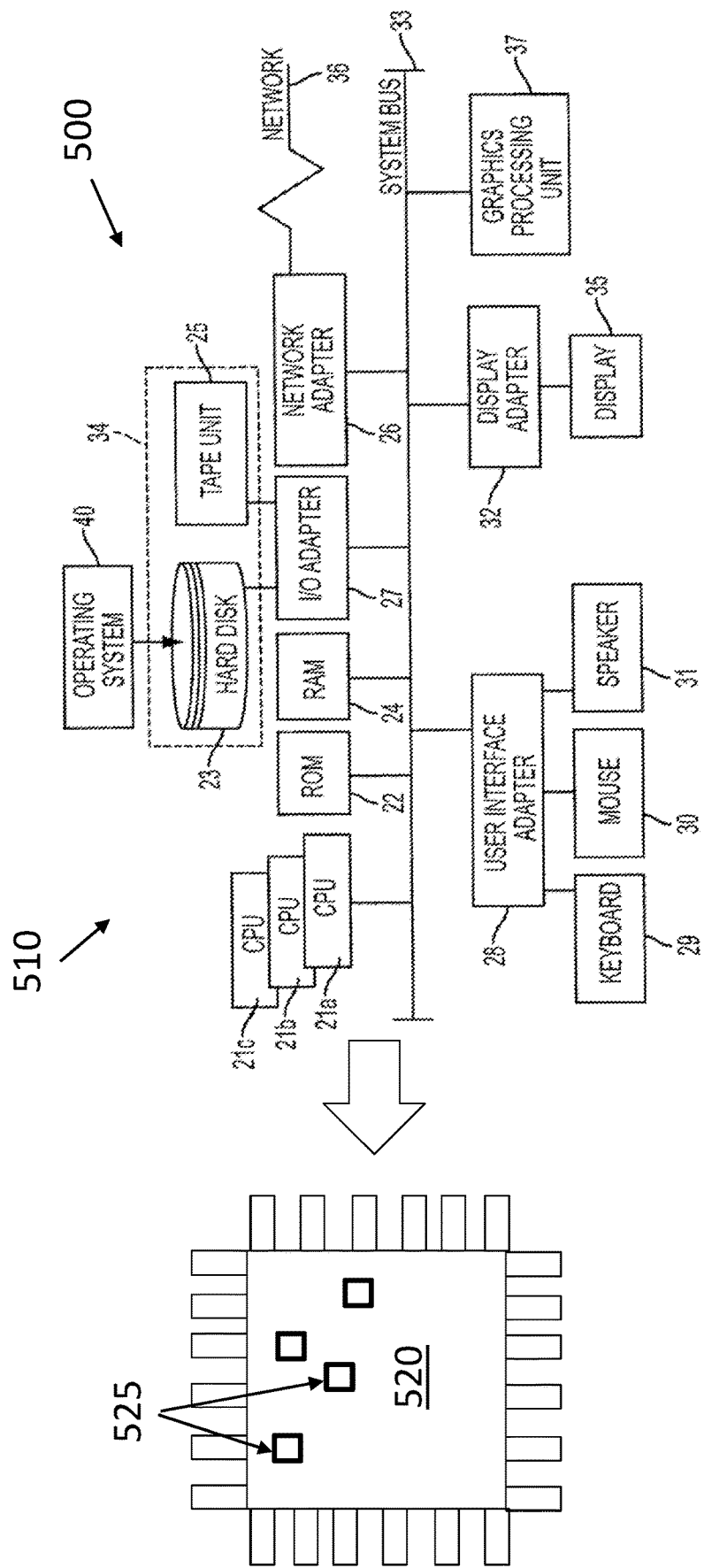
FIG. 5 is a block diagram of a system to perform the development of an integrated circuit using a netlist that is optimized for local clock controller timing improvement according to one or more embodiments of the invention.

FIG. 5 is a block diagram of a system 500 to perform the development of an integrated circuit 520 using a netlist that is optimized for local clock controller timing improvement according to one or more embodiments. Exemplary latches 525 are indicated as being part of the integrated circuit 520. The system 500 includes a processing system 510 used to generate the design that is ultimately fabricated into the integrated circuit 520. The steps involved in the fabrication of the integrated circuit 520 are well-known and briefly described herein. Once the physical layout is finalized, based, in part, on selection of a via mesh specification among universally routable via mesh specifications developed according to embodiments of the invention, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 6.

The processing system 510 has one or more central processing units (processors) 21*a*, 21*b*, 21*c*, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 510.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 510 can be stored in mass storage 34. The RAM 22, ROM 24, and mass storage 34 are examples of memory 19 of the processing system 110. A network adapter 26 interconnects system bus 33 with an outside network 36 enabling the processing system 110 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 510 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 510 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 510.

Figure 6:
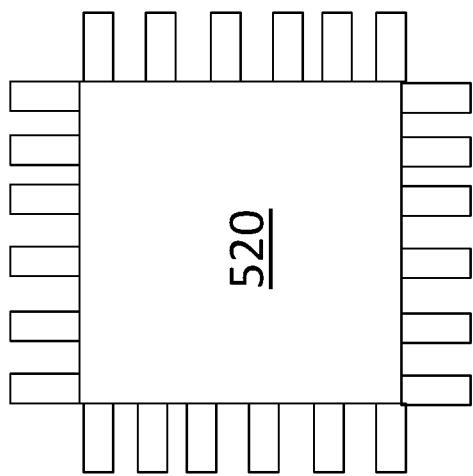
FIG. 6 is a process flow of a method of fabricating the integrated circuit according to exemplary embodiments of the invention.
Figure 6:
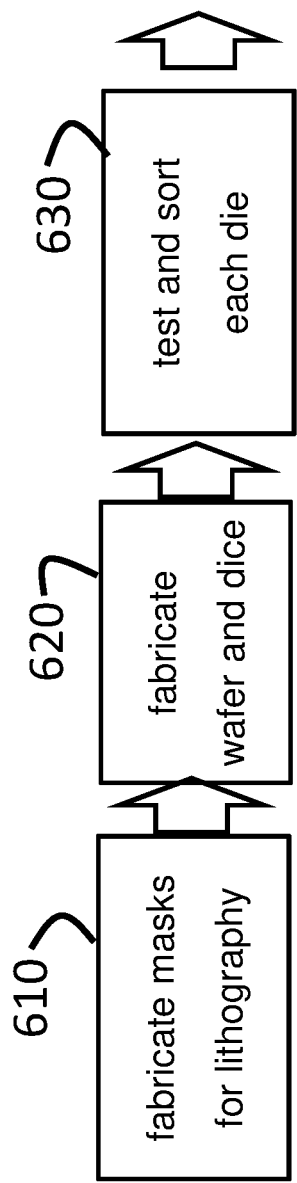

FIG. 6 is a process flow of a method of fabricating the integrated circuit according to exemplary embodiments of the invention. Once the physical design data is obtained, based, in part, on the processes discussed with reference to FIGS. 2-4, the integrated circuit 520 can be fabricated according to known processes that are generally described with reference to FIG. 5. Generally, a wafer with multiple copies of the final design is fabricated and cut (i.e., diced) such that each die is one copy of the integrated circuit 520. At block 610, the processes include fabricating masks for lithography based on the finalized physical layout. At block 620, fabricating the wafer includes using the masks to perform photolithography and etching. Once the wafer is diced, testing and sorting each die is performed, at block 630, to filter out any faulty die.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one"

and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining, by a processor, a netlist for an integrated circuit design, wherein the netlist comprises a design for placement of a plurality of latches within an integrated circuit;
   determining a set of timing paths from the netlist, wherein each timing path in the set of timing paths comprises a capture latch and at least one launch latch connected to a same local clock buffer controller through a local clock buffer OR circuit;
   calculating a slack value for each timing path in the set of timing paths;
   determining one or more candidate timing paths from the set of timing paths, wherein the one or more candidate timing paths have a slack value below a threshold slack value;
   calculating a score for each candidate timing path of the one or more candidate timing paths based on a count of a number of launch latch and capture latch pairs within the candidate timing path;
   adjusting an interconnect for a first candidate timing path from the one or more candidate timing paths based on the first candidate timing path having a highest score of all scores for the one or more candidate timing path; and
   generating an updated netlist based on the adjusting the interconnect for the first candidate timing path.

2. The computer-implemented method of claim 1, wherein adjusting the interconnect for the first candidate timing path comprises:
   disconnecting a first local clock buffer OR circuit from a first local clock buffer controller in the first candidate timing path; and
   connecting the first local clock buffer OR circuit to a second local clock buffer controller.

3. The computer-implemented method of claim 2, wherein the second local clock buffer is a nearest local clock buffer controller to the first local clock buffer OR circuit.

4. The computer-implemented method of claim 1, further comprising:
   determining a second set of timing paths from the updated netlist;
   calculating a second slack value for each timing path in the second set of timing paths;
   determining one or more candidate timing paths from the second set of timing paths, wherein the one or more candidate timing paths have a slack value below the threshold slack value;
   calculating a second score for each candidate timing path of the one or more candidate timing paths based on a count of a number of launch latch and capture latch pairs within the candidate timing path;
   adjusting an interconnect for a second candidate timing path from the one or more candidate timing paths based on the second candidate timing path having a highest score of all scores for the one or more candidate timing path; and
   updating the updated netlist based on the adjusting of the interconnect for the second candidate timing path.

5. The computer-implemented method of claim 1, further comprising:
   iteratively calculating a score for each candidate timing path of the one or more candidate timing paths until a total score for the netlist is less than a total score threshold, wherein the total score comprises a summation of each score for each candidate timing path.

6. The computer-implemented method of claim 1, wherein calculating the slack value for each timing path in the set of timing paths comprises:
   determining a desired timing for the timing path based on a timing metric for the timing path; and
   calculating an actual timing for the timing path, wherein the slack value comprises a difference between the actual timing and the desired timing.

7. The computer-implemented method of claim 1, further comprising:
   causing, by the processor, the fabrication of the integrated circuit design based on the updated netlist.

8. A system comprising:
   a memory having computer readable instructions; and
   one or more processors for executing the computer readable instructions, the computer readable instructions controlling the one or more processors to perform operations comprising:
   determining, by a processor, a netlist for an integrated circuit design, wherein the netlist comprises a design for placement of a plurality of latches within an integrated circuit;
   determining a set of timing paths from the netlist, wherein each timing path in the set of timing paths comprise a capture latch and at least one launch latch connected to a same local clock buffer controller through a local clock buffer OR circuit;
   calculating a slack value for each timing path in the set of timing paths;
   determining one or more candidate timing paths from the set of timing paths, wherein the one or more candidate timing paths have a slack value below a threshold slack value;
   calculating a score for each candidate timing path of the one or more candidate timing paths based on a count of a number of launch latch and capture latch pairs within the candidate timing path;
   adjusting an interconnect for a first candidate timing path from the one or more candidate timing paths based on the first candidate timing path having a highest score of all scores for the one or more candidate timing path; and
   generating an updated netlist based on the adjusting the interconnect for the first candidate timing path.

9. The system of claim 8, wherein adjusting the interconnect for the first candidate timing path comprises:
- disconnecting a first local clock buffer OR circuit from a first local clock buffer controller in the first candidate timing path;
- connecting the first local clock buffer OR circuit to a second local clock buffer controller.

10. The system of claim 9, wherein the second local clock buffer is a nearest local clock buffer controller to the first local clock buffer OR circuit.

11. The system of claim 8, wherein the operations further comprise:
- determining a second set of timing paths from the updated netlist;
- calculating a second slack value for each timing path in the second set of timing paths;
- determining one or more candidate timing paths from the second set of timing paths, wherein the one or more candidate timing paths have a slack value below the threshold slack value;
- calculating a second score for each candidate timing path of the one or more candidate timing paths based on a count of a number of launch latch and capture latch pairs within the candidate timing path;
- adjusting an interconnect for a second candidate timing path from the one or more candidate timing paths based on the second candidate timing path having a highest score of all scores for the one or more candidate timing path; and
- updating the updated netlist based on the adjusting of the interconnect for the second candidate timing path.

12. The system of claim 8, wherein the operations further comprise:
- iteratively calculating a score for each candidate timing path of the one or more candidate timing paths until a total score for the netlist is less than a total score threshold, wherein the total score comprises a summation of each score for each candidate timing path.

13. The system of claim 8, wherein calculating the slack value for each timing path in the set of timing paths comprises:
- determining a desired timing for the timing path based on a timing metric for the timing path; and
- calculating an actual timing for the timing path, wherein the slack value comprises a difference between the actual timing and the desired timing.

14. The system of claim 8, wherein the operations further comprise:
- causing the fabrication of the integrated circuit design based on the updated netlist.

15. A computer program product comprising a computer readable storage medium having program instructions embodied therewith, the program instructions executable by one or more processors to cause the one or more processors to perform operations comprising:
- determining, by a processor, a netlist for an integrated circuit design, wherein the netlist comprises a design for placement of a plurality of latches within an integrated circuit;
- determining a set of timing paths from the netlist, wherein each timing path in the set of timing paths comprise a capture latch and at least one launch latch connected to a same local clock buffer controller through a local clock buffer OR circuit;
- calculating a slack value for each timing path in the set of timing paths;
- determining one or more candidate timing paths from the set of timing paths, wherein the one or more candidate timing paths have a slack value below a threshold slack value;
- calculating a score for each candidate timing path of the one or more candidate timing paths based on a count of a number of launch latch and capture latch pairs within the candidate timing path;
- adjusting an interconnect for a first candidate timing path from the one or more candidate timing paths based on the first candidate timing path having a highest score of all scores for the one or more candidate timing paths; and
- generating an updated netlist based on the adjusting the interconnect for the first candidate timing path.

16. The computer program product of claim 15, wherein adjusting the interconnect for the first candidate timing path comprises:
- disconnecting a first local clock buffer OR circuit from a first local clock buffer controller in the first candidate timing path;
- connecting the first local clock buffer OR circuit to a second local clock buffer controller.

17. The computer program product of claim 16, wherein the second local clock buffer is a nearest local clock buffer controller to the first local clock buffer OR circuit.

18. The computer program product of claim 15, wherein the operations further comprise:
- determining a second set of timing paths from the updated netlist;
- calculating a second slack value for each timing path in the second set of timing paths;
- determining one or more candidate timing paths from the second set of timing paths, wherein the one or more candidate timing paths have a slack value below the threshold slack value;
- calculating a second score for each candidate timing path of the one or more candidate timing paths based on a count of a number of launch latch and capture latch pairs within the candidate timing path;
- adjusting an interconnect for a second candidate timing path from the one or more candidate timing paths based on the second candidate timing path having a highest score of all scores for the one or more candidate timing paths; and
- updating the updated netlist based on the adjusting the interconnect for the second candidate timing path.

19. The computer program product of claim 15, wherein the operations further comprise:
- iteratively calculating a score for each candidate timing path of the one or more candidate timing paths until a total score for the netlist is less than a total score threshold, wherein the total score comprises a summation of each score for each candidate timing path.

20. The computer program product of claim 15, wherein calculating the slack value for each timing path in the set of timing paths comprises:
- determining a desired timing for the timing path based on a timing metric for the timing path; and
- calculating an actual timing for the timing path, wherein the slack value comprises a difference between the actual timing and the desired timing.

* * * * *